(12) United States Patent
Zhang et al.

(10) Patent No.: US 10,251,027 B2
(45) Date of Patent: Apr. 2, 2019

(54) NAVIGATION SYSTEM TRACKING HIGH-EFFICIENCY INDOOR LIGHTING FIXTURES

(71) Applicant: Wisconsin Alumni Research Foundation, Madison, WI (US)

(72) Inventors: Xinyu Zhang, Madison, WI (US); Chi Zhang, Madison, WI (US)

(73) Assignee: Wisconsin Alumni Ressarch Foundation, Madison, WI (US)

( * ) Notice: Subject to any disclaimer, the term of this patent is extended or adjusted under 35 U.S.C. 154(b) by 0 days.

(21) Appl. No.: 15/379,950

(22) Filed: Dec. 15, 2016

(65) Prior Publication Data

US 2018/0176739 A1 Jun. 21, 2018

(51) Int. Cl.
| | |
|---|---|
| *H04W 4/33* | (2018.01) |
| *H04W 4/024* | (2018.01) |
| *H04W 4/029* | (2018.01) |
| *H04W 88/02* | (2009.01) |
| *H04W 4/04* | (2009.01) |

(52) U.S. Cl.
CPC ........... *H04W 4/043* (2013.01); *H04W 4/029* (2018.02); *H04W 4/024* (2018.02); *H04W 4/33* (2018.02); *H04W 88/02* (2013.01)

(58) Field of Classification Search
CPC .............................. H04W 4/043; H04W 88/02
See application file for complete search history.

(56) References Cited

U.S. PATENT DOCUMENTS

| | | | | |
|---|---|---|---|---|
| 5,483,371 | A * | 1/1996 | Farinelli, Jr. | ............ H04N 7/22 348/E7.094 |
| 7,706,917 | B1 | 4/2010 | Chiappetta et al. | |
| 9,813,150 | B1 * | 11/2017 | Bitra | .................... H04B 10/116 |
| 9,857,162 | B1 * | 1/2018 | Gum | .................... G01B 11/002 |
| 2006/0175530 | A1 * | 8/2006 | Wilcox | .................. G02B 26/06 250/208.1 |
| 2007/0290284 | A1 * | 12/2007 | Shaffer | ............... H01L 27/1446 257/432 |
| 2008/0002197 | A1 * | 1/2008 | Sun | ........................ G01B 11/26 356/300 |
| 2008/0059069 | A1 * | 3/2008 | Trutna | .................. G08G 1/166 701/301 |

(Continued)

FOREIGN PATENT DOCUMENTS

WO 2015010967 A1 1/2015

OTHER PUBLICATIONS

Chi Zhang et al.: "LiTell: robust indoor localization using unmodified light fixtures." In Proceedings of the 22nd Annual International Conference on Mobile Computing and Networking, pp. 230-242. ACM, 2016.; Madison, WI.

(Continued)

*Primary Examiner* — Qun Shen
(74) *Attorney, Agent, or Firm* — Boyle Fredrickson, SC

(57) ABSTRACT

A system for identifying the location of a mobile device uses signatures of standard room lighting derived from the frequency spectrum of light fluctuations associated with driver circuitry of that lighting. Improved sensitivity (frequency and dynamic range) are provided by using a pair of dedicated photodetectors which may deduce a one-dimensional angular location of a light source by comparing the signals developed by two photodetectors having different angular sensitivities.

24 Claims, 5 Drawing Sheets

(56) References Cited

U.S. PATENT DOCUMENTS

| | | | | |
|---|---|---|---|---|
| 2010/0142328 A1* | 6/2010 | Beck | ............... | F41G 3/147 |
| | | | | 367/129 |
| 2012/0140231 A1* | 6/2012 | Knox | ............... | G01N 21/53 |
| | | | | 356/442 |
| 2012/0274745 A1* | 11/2012 | Russell | ............... | G06F 3/013 |
| | | | | 348/46 |
| 2015/0330830 A1* | 11/2015 | Akkaya | ............... | G01H 9/004 |
| | | | | 385/25 |
| 2015/0373502 A1 | 12/2015 | Wormald et al. | | |
| 2015/0373503 A1* | 12/2015 | Jovicic | ............... | G01S 5/0252 |
| | | | | 455/456.1 |
| 2016/0197675 A1* | 7/2016 | Ganick | ............... | H04N 5/2256 |
| | | | | 398/172 |
| 2016/0227634 A1* | 8/2016 | Engelen | ............... | H05B 37/0245 |
| 2016/0323035 A1 | 11/2016 | Jovicic et al. | | |

OTHER PUBLICATIONS

Myoung-Geun Moon et al. Indoor Positioning System using LED Lights and a Dual Image Sensor. Journal of the Optical Society of Korea. Dec. 25, 2015, vol. 19, No. 6, pp. 586-591, ISSN 1226-4776. See pp. 586-590; and figures 1-2, 7.

* cited by examiner

NAVIGATION SYSTEM TRACKING HIGH-EFFICIENCY INDOOR LIGHTING FIXTURES

STATEMENT REGARDING FEDERALLY SPONSORED RESEARCH OR DEVELOPMENT

This invention was made with government support under CNS1343363 awarded by the National Science Foundation. The government has certain rights in the invention.

BACKGROUND OF THE INVENTION

The present invention relates to systems for accurately locating mobile devices as they move through an area, and in particular to a system providing location-sensing by tracking the locations of standard indoor light fixtures.

Increased use of light emitting diodes (LEDs) to provide for the primary environmental lighting in buildings and the like (termed herein "ambient lighting") has raised the possibility of using these lights as beacons to identify the location of a mobile device through triangulation or the like. With such a system, each LED light may transmit a unique code in its light output identifying the light and/or its location. LEDs are particularly suited to this application because they can switch on and off at a high rate of speed imperceptible to human eyes but suitable for communicating data. The IEEE 802.15.7 standard has established a basis for visible light communication protocols allowing communication of up to 96 megabits per second.

U.S. patent application Ser. No. 14/980,103 filed Dec. 28, 2015, assigned to the assignee of the present application and hereby incorporated by reference, describes a system using light communication signals of this type to identify the location of a mobile device.

Navigation using data communicated through LED ambient lighting can require substantial investment in building infrastructure both to upgrade current light fixtures to network-connectable LED light fixtures and to properly configure a network for providing navigation signals. These costs are significant obstacles to the development and deployment of such systems.

U.S. patent application Ser. No. 15/164,195 filed May 25, 2016, assigned to the assignee of the present application and hereby incorporated by reference, describes a system that does not require network-connected light fixtures and in fact can work with standard fluorescent lights. The system associates the lights with unique frequency signatures that can identify light fixtures for navigation. A camera, for example, of a type found in a standard cell phone, may be used to determine the angle and signature of multiple lights to provide for triangulation type location calculations.

A standard camera provides for a convenient mechanism for identifying the angular bearing of multiple light sources, but also has significant limitations in this application. The limited bandwidth of the camera can make it difficult to distinguish between the signatures of multiple sources and high-frequency signature features. In addition, the low dynamic range of the camera makes it difficult to detect and measure the signature of individual light sources on a high ceiling, for example, in a warehouse type retail environment.

SUMMARY OF THE INVENTION

The present invention provides a navigation system that uses as few as two standard photodetectors to provide light sources based indoor navigation. In comparison to camera sensors, the photodetectors may have far superior frequency response and dynamic range sensitivity allowing the invention to be used in facilities with high ceilings and light sources including both fluorescent and LED lamps. Determining the angular bearing of the light fixtures, necessary for navigation, is possible by using photodetectors having slightly different angular sensitivities. The difference in detected light by the two photodetectors provides information about the angle of the light received.

Specifically, in one embodiment, the invention provides a system for indoor location determination having a mobile device with a first and second independent light sensor each having different angular sensitivities along respective axes within an overlapping field-of-view of the first and second light sensors. The invention further includes an electronic computer receiving signals from the first and second light sensors to: (i) identify multiple light source signals from the first and second light sensors within the field-of-view according to known light source signatures; (ii) determine an angle of the multiple light sources with respect to the respective axes based on the different angular sensitivities of the first and second light sensors; and (iii) identify the location of the mobile device based on the angle of the multiple light sources and a known mapping of light sources to locations.

It is thus a feature of at least one embodiment of the invention to provide the necessary ability to determine the angular position of different light fixtures while avoiding the limitations in bandwidth and sensitivity associated with standard camera detectors.

The overlapping field-of-view between the two photodiodes may be greater than 60 degrees.

It is thus a feature of at least one embodiment of the invention to provide sufficient field-of-view to capture multiple light fixtures in a normal environment necessary for accurate location determination.

The first and second light sensors may provide a cutoff frequency greater than 80 kilohertz and/or a frequency response operatively extending to 160 kilohertz.

It is thus a feature of at least one embodiment of the invention to greatly increase the frequency sensitivity of the light sensors to permit improved signature detection of light fixtures such as LEDs which provide significant high-frequency modulation useful for signatures.

The first and second light sensors may have a dynamic range of at least 80 decibels.

It is thus a feature of at least one embodiment of the invention to provide suitable sensitivity to detect signatures of light fixtures on extended height ceilings greater than three or four meters above the floor.

The first and second light sensors have parallel axes.

It is thus a feature of at least one embodiment of the invention to simplify the calculation of light incidence angle by providing substantially identical radial symmetry in sensitivity of the detectors.

Each of the first and second light sensors may have a separate lens.

It is thus a feature of at least one embodiment of the invention to flexibly provide different angular sensitivities through adjustment of the optical path to the sensor.

The electronic computer may hold a map, possibly a downloaded portion of a larger map, identifying locations of light sources and light source signatures for those light sources and may identify the location of the multiple light sources by matching light source signatures to frequencies extracted from the signals of the first and second light sensors.

It is thus a feature of at least one embodiment of the invention to make use of signatures resulting from natural manufacturing variations in the light fixtures captured in a map.

The electronic computer may isolate multiple light signals by identifying and suppressing sidebands of fundamental frequencies of each of the multiple light sources.

It is thus a feature of at least one embodiment of the invention to provide a method of robustly separating complex signatures from multiple lights in the field-of-view.

The mobile device may further include a three-axis accelerometer, and the electronic computer may identify an orientation of the axes to correct the determined angles of the multiple light sources.

It is thus a feature of at least one embodiment of the invention to accommodate possible misalignment of the axes of the photodetectors from a preferred vertical orientation.

The mobile device may further include at least one of a gyroscope and a compass, and the computer may augment identification of the location of the mobile device using dead reckoning based on inertial guidance provided by the three-axis accelerometer.

It is thus a feature of at least one embodiment of the invention to provide a hybrid location system using multiple navigational inputs.

The mobile device may include a cell phone communication circuit for allowing communication over a cell phone network.

It is thus a feature of at least one embodiment of the invention to permit incorporation of the invention into a standard cellular phone and/or to permit downloading of necessary map data for a variety of different locations.

Alternatively the mobile device may be a vehicle having electric motors for movement, and wherein the electronic computer further controls the electric motors to control motion of the vehicle using the identified location of the mobile device.

It is thus a feature of at least one embodiment of the invention to provide a navigational system for automation and the like.

The multiple light sources may include LED lights.

It is thus a feature of at least one embodiment of the invention to provide a navigational system that may work with LED lamps exhibiting signature characteristics in higher frequencies than fluorescent lights.

The multiple light sources may be positioned at a ceiling at least three meters or at least four meters above the ground and the first and second independent light sensors may be elevated from the floor by less than 1.5 meters.

It is thus a feature of at least one embodiment of the invention to provide a system that can work with a wide variety of indoor environments including those with high ceilings.

These particular objects and advantages may apply to only some embodiments falling within the claims and thus do not define the scope of the invention.

DETAILED DESCRIPTION OF THE PREFERRED EMBODIMENT

Figure 1:
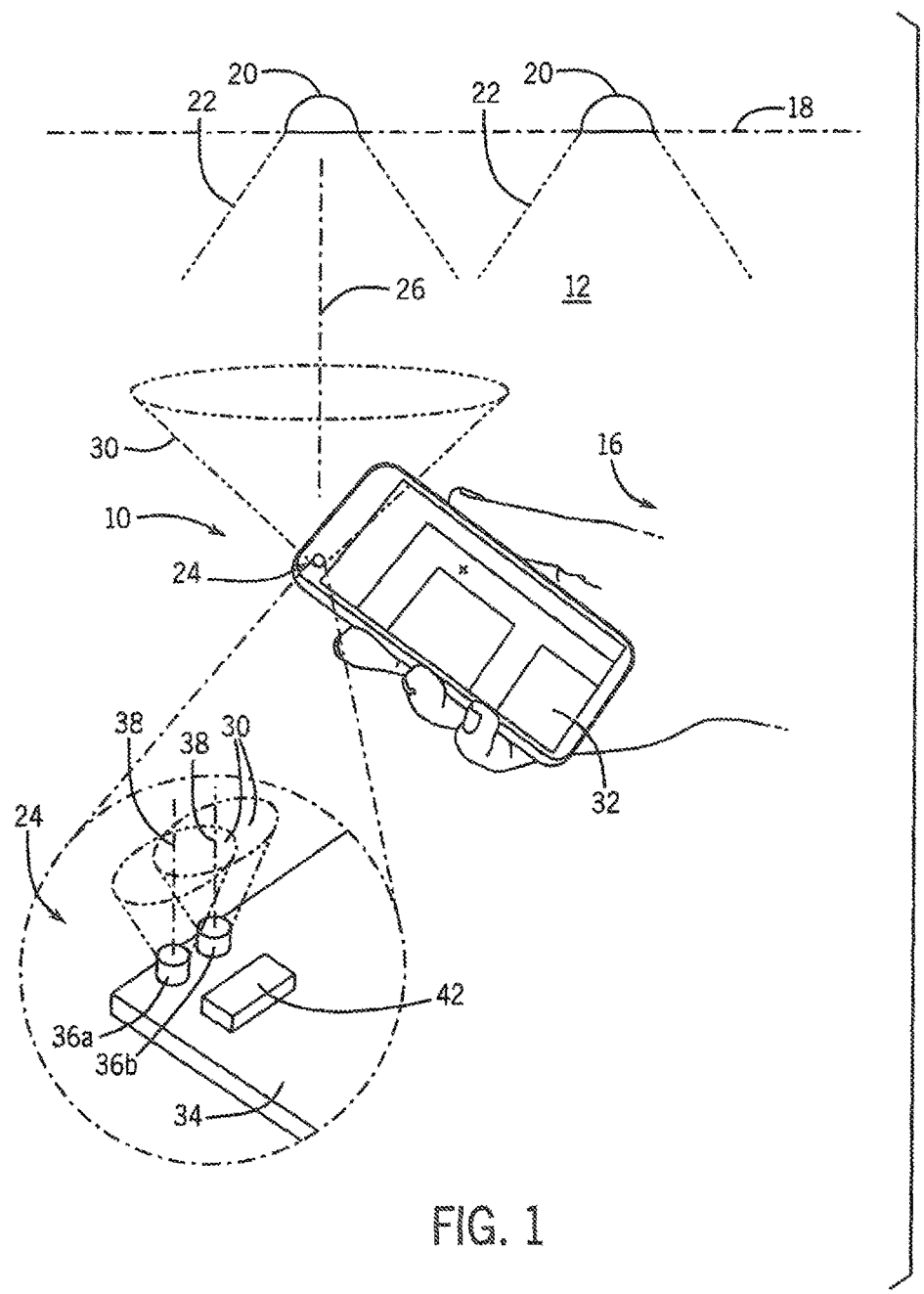
FIG. 1 is a simplified perspective view of the invention as incorporated into a mobile device, such as a cell phone or tablet, showing an acquisition of light from several light sources and showing in an expanded inset two standard photodetectors used for measuring both signature and light angle.

Referring now to FIG. 1, the present invention may provide for a mobile device 10 operating within the interior 12 of a structure such as a store, office building, hospital, airline terminal or the like, having an area over which individuals may move.

The interior 12 may be illuminated, for example, by light sources 20 mounted on a ceiling line 18 each projecting a downward cone 22 of visible light to illuminate the interior 12 and the mobile device 10. The location of the light sources 20 will normally be on a regular grid and the volumes of the cones 22 will typically overlap for the purpose of providing uniform lighting. The term "cone" is intended to describe only the approximate shape of the light beam, it being understood that the shape of the illuminated region for a given light fixture is highly variable and that the boundaries of projected light are generally gradated and indistinct.

Each of the light sources 20 may be of conventional design and may be either fluorescent, LED, or other high-efficiency light systems other than incandescent lighting. For fluorescent lights, the light source 20 may provide one or more fluorescent lamps controlled by an electronic ballast receiving line voltage of about 110 volts AC at 60 cycles. Fluorescent lamps, as are understood in the art, provide a low-pressure glass envelope typically supporting a mercury vapor gas discharge which produces shortwave ultraviolet light. This ultraviolet light strikes a phosphor coating on the inside of the lamp envelope causing the phosphor to glow.

Alternatively, the light sources 20 may provide for LED light sources also receiving line voltage of about 110 volts AC at 60 cycles. LEDs produce light from electroluminescence produced by the transition of electrons between energy states in a semiconductor. LEDs for lighting in buildings usually provide a phosphor as excited by the LED (for example, in the ultraviolet range) producing a desired white light.

The fluorescent tubes or LEDs of the light sources 20 do not connect directly to line voltage but must be driven by an inverter/converter circuitry that processes the line voltage to provide proper voltages and currents for the particular lamp type. For fluorescent tubes, the ballast serves to prevent the low impedance of the electronic are in the fluorescent lamp from drawing too much power. Modern lighting fixtures principally use electronic ballasts that further operate by converting line voltage to DC power and then "inverting" that DC power to a high-frequency signal generally in the range of 20,000 to 60,000 hertz. The inverter uses solid-state components such as transistors to perform the inversion and the ballast function of current limiting. Because of the potential of electromagnetic interference at the output frequency of the inverter, the output of electronic ballast is usually filtered using noise suppression filtration to block radio interference (electromagnetic interference) from this high-frequency signal.

For LED lamps, circuitry is provided that converts the AC line power to a controlled direct current at a desired voltage for the LEDs. The circuitry also makes use of inverter/converter designs using solid-state components such as transistors operating at high switching frequencies.

The inventors have determined that high-frequency signals from the circuitry associated with both fluorescent lamps and LED lamps can be detected in the light output from the light source 20 as fluctuations in light intensity. This is despite phosphor persistence and electromagnetic interference filtering that might be expected to eliminate such signals and despite the radically different technologies these lamps represent. The high-frequency signals from each light source 20 as may be characterized by associated identifying frequency spectra vary significantly between light sources 20 as a result of manufacturing variation by such a degree that these variations provide a "fingerprint" or signature of the light source 20 that can be used to distinguish between each light source 20. In addition, these signatures are relatively stable over time providing a persistent method of identifying each light fixture.

Referring still to FIG. 1, the mobile device 10 may provide for a light sensor 24 that may be directed generally upward, for example, along a vertical axis 26 toward a ceiling line 18 and which provides a generally conical field-of-view 30 to receive the light from multiple light sources 20 (ideally three or more) when held for viewing of a display touch screen 32 on the mobile device 10 by a user 16, for example, at approximately waist height of one meter.

The light sensor 24 maybe held on a circuit card 34 internal to the mobile device 10 and may provide a first and second discrete photodetector 36a and 36b each having a principal axis of sensitivity along separate optical axes 38 that are generally parallel to each other and parallel to vertical axis 26. For practical purposes, the optical axes 38 may be considered collinear. Each of the photodetectors 36a and 36b may have overlapping fields-of-view whose overlap provides the conical field-of-view 30 for the light sensor 24. The conical field-of-view 30 extends in an angular range about the vertical axis 26 by greater than 30 degrees and typically greater than 90 degrees and preferably greater than 120 degrees. The size of the field-of-view 30 may be considered an extent of sensitivity bounded by a maximum decrease in sensitivity from maximum sensitivity along the vertical axis 26 or axes 38, for example, by 3 dB.

Figure 2:
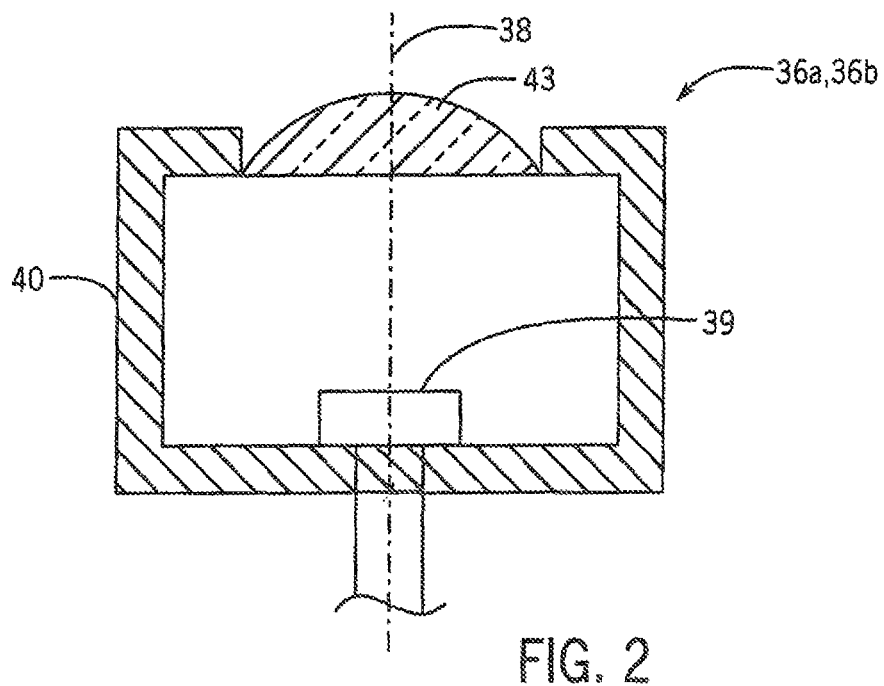
FIG. 2 is a schematic cross-section of one of the light sensors showing its independent optical path through a lens.

Referring also to FIG. 2, each photodetector 36 may include a physically separate and electrically independent solid-state photosensor element 39, for example, a phototransistor or photodiode, held within a housing 40 supporting an optical element 43, for example, a convex lens for focusing light received along axis 38 onto the surface of the solid-state photosensor element 39.

Referring again to FIG. 1, electrical signals from the photodetectors 36 may be received by receiving circuitry 42, for example, level shifters and amplifiers, to provide independent light signals measuring the light received from one or more light sources 20 by a specific one of the photodetectors 36. Generally the photodetectors 36 will provide for extremely high dynamic range of sensitivity. For comparison, a typical CMOS camera found in a current cell phone normally has a dynamic range of approximately 1500 or 64 dB measured with respect to the light sensor noise floor. The photodetectors 36 may have a dynamic range of 30 decibels or higher and in excess of 80 dB fully exploited by the signal chain processing the signals.

The photodetectors 36 may also exhibit a high frequency response having a cutoff frequency in excess of 60 kilohertz and as much as 160 kilohertz allowing better resolution and higher frequency sensitivity useful for distinguishing the signatures of LED light sources 20. Cutoff frequency may be defined as a point at which the signal drops by three decibels from maximum sensitivity. After processing by the receiving circuitry 42, the signals from the photodetectors 36 may be usefully sampled to extract signals in excess of 60 kilohertz and as much as 160 kilohertz.

Figure 3:
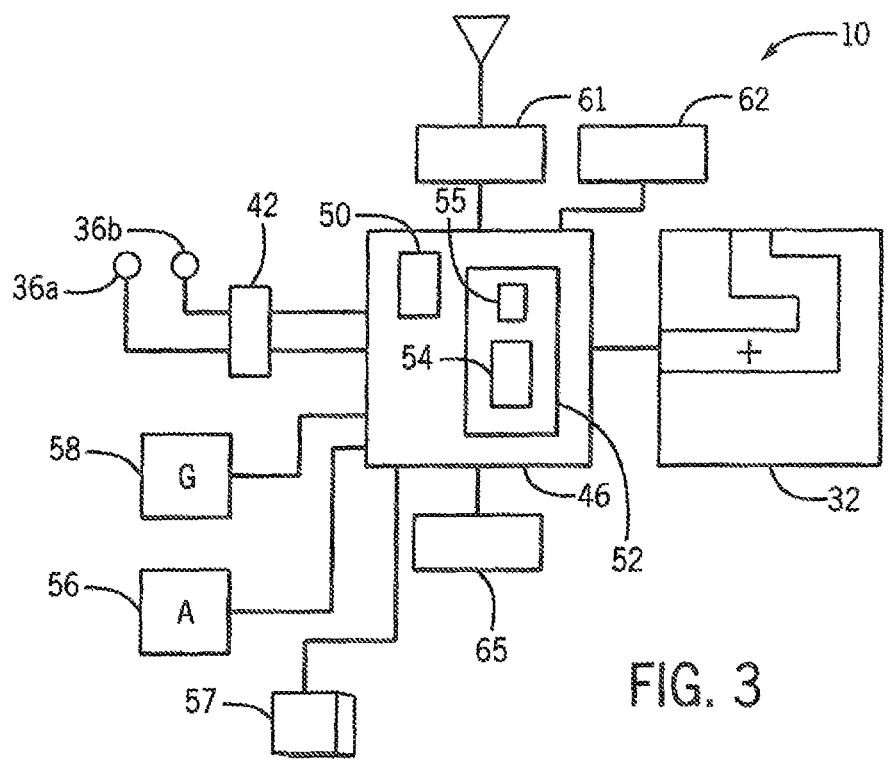
FIG. 3 is a block diagram of the principal components of the mobile device.

Referring now to FIG. 3, the signals from the photodetectors 36a and 36b, after processing by receiving circuitry 42, may be received by a processor system 46, for example, providing one or more processor cores 50 communicating with a memory 52 holding a stored program 54 and map 55 as will be discussed below. The processor system 46 may also receive signals from a multi-axis accelerometer 56 providing, for example, accelerometers along three Cartesian coordinates together with rotational accelerometers or gyroscopes as well as a magnetic compass 58, for example, using solid-state or fluxgate technology. The processor system 46 may also receive input from a camera 57, for example, providing an array of light-sensitive CCD or CMOS elements for producing high-resolution picture images; however, a camera 57 is not required by some embodiments of the present invention.

The processor system 46 may provide output to the touch screen 32 in the form of navigational information, for example, a graphical representation map and location cursor showing the location of the mobile device 10, and may receive input commands from the user as is generally understood in the art. In addition the processor system 46 may communicate with one or more wireless transceivers 61 and 62, for example, providing for cellular data communication and/or wireless data communication generally known in the art. A battery 65 allows the mobile system to receive power in a mobile capacity.

The circuitry of the mobile device 10 may be found in current cell phones and tablet computers generally understood in the art with respect to mobile devices except for the addition of the photodetectors 36a and 36b and receiving circuitry 42 as has been discussed.

Figure 4:
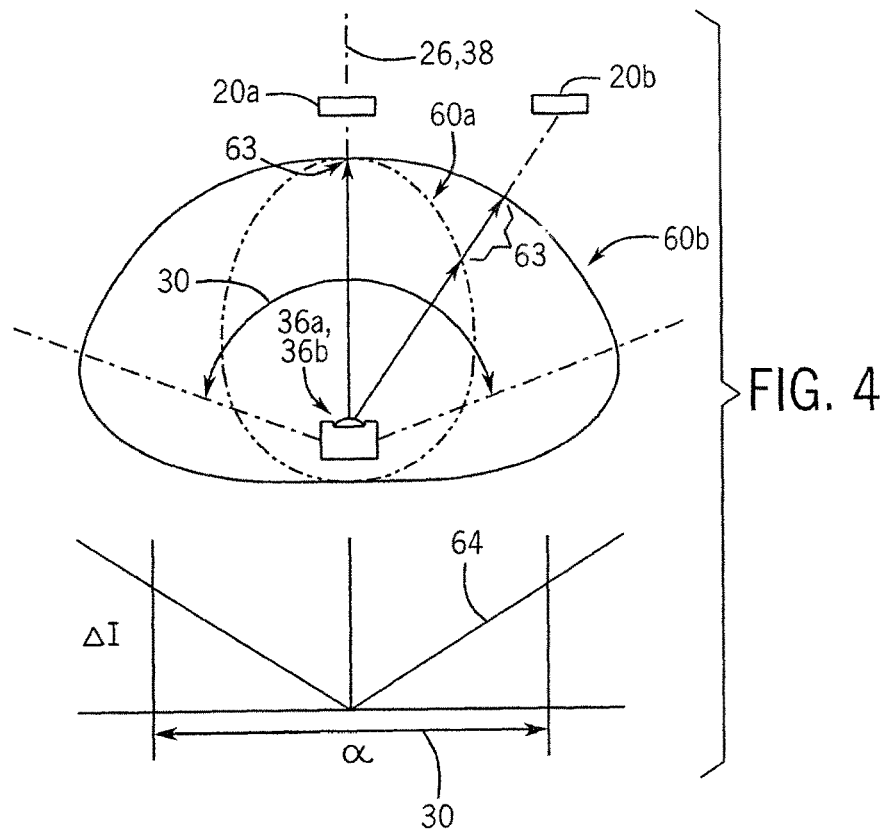
FIG. 4 is a plot of the different light sensitivities as a function of angle for the two photodetectors showing the computation of a difference value related to an angle of the light source.

Referring now to FIG. 4, each of the photodetectors 36a and 36b will be selected to exhibit different angular sensitivities 60a and 60b with respect to their optical axes 38. Angular sensitivities 60 are generally symmetric about the optical axis 38 and indicate a sensitivity to receive light as a function of angle from the optical axes 38. Although the optical axes 38 of the photodetectors 36a and 36b need not be parallel, they are shown as such for clarity in the simplest embodiment and may be treated as practically collinear for light sources 20 several orders of magnitude farther away from the photodetectors 36 than their separation from each other. Photodetectors 36a and 36b with different angular sensitivity 60a and 60b may be obtained by using photodetectors from different manufacturers with different product specifications or by modifying the optical path including the optical element 43 and housing 40.

For two different light sources 20*a* and 20*b* having different angular relationships with respect to the photodetectors 36*a* and 36*b*, a signal difference 63 may be measured between signals produced by the photodetectors 36*a* and 36*b*. In the example of FIG. 4, that signal difference 63 will be zero for the signals from photodetector 36*a* and 36*b* for light source 20*a* aligned along the vertical axis 26 and optical axes 38 and thus at the peak sensitivity for both photodetectors 36*a* and 36*b*. For this purpose, the photodetectors 36*a* and 36*b* may be calibrated or normalized to a common peak value. In contrast, the difference 63 for light source 20*b* angularly displaced from optical axes 38 will have a finite magnitude being generally a function of angular displacement of the light source 20*b* from the optical axes 38. Generally it is desired that the angular sensitivities 60*a* and 60*b* of the photodetectors 36*a* and 36*b* differ so as to provide a smoothly varying signal difference 63 as a function of angle of the light source 20 from the optical axes 38 as opposed to a noncontinuous signal difference that might be obtained if the angular sensitivities 60*a* and 60*b* where the result of a sharp mask within the overlapping field-of-view 30 of each of the photodetectors 36*a* and 36*b*. That is, the angular sensitivities 60*a* and 60*b* are selected so that a difference function 64 may be developed indicating a one-dimensional angle of the light source 20.

This ability to identify the angle of a light source 20 can be extended to multiple light sources 20 within the field-of-view 30 by isolating the light from each light source 20 by means of the unique signature of the light from that light source 20.

Figure 5:
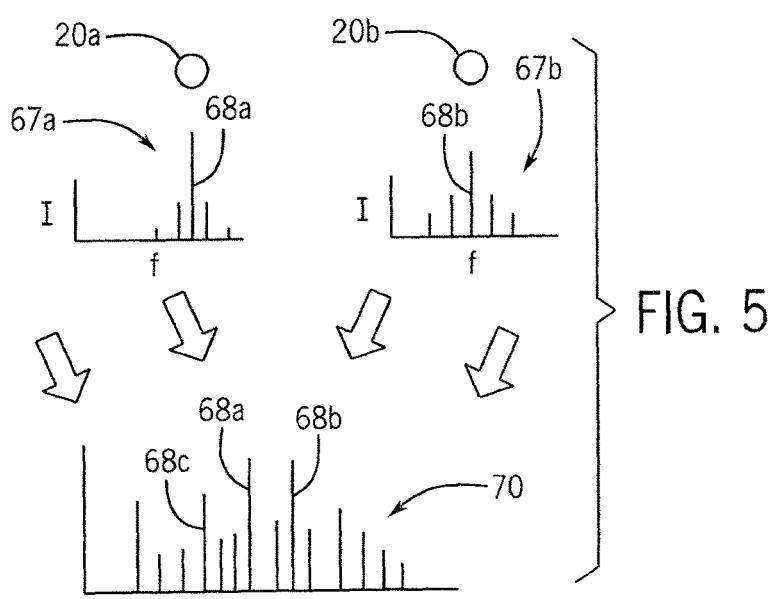
FIG. 5 is a diagram showing spectral plots of the signatures of each light source as combined when detected by the photodetectors of FIG. 1.

Referring to FIG. 5, as discussed above, the inventors have determined that both LED and fluorescent light sources 20 produce a variation in light output that has a frequency spectrum signature 67 that can be used to practically distinguish nearby light sources 20 from each other. Generally the signatures 67 are influenced by manufacturing variations and thus will exhibit, for example, different center frequencies 68*a* and 68*b*, for example, unique to each light source 20*a* and 20*b*.

In this regard, the invention contemplates that a map 55 (shown in FIG. 3) will be prepared of each interior 12 where location determination is desired. This mapping process is described generally in the above referenced co-pending U.S. patent application Ser. No. 15/164,195 and may be performed by a separate handheld cataloging device, such as a smart phone, with an individual walking through the interior 12 using other navigational techniques or entering a location manually using a floorplan or the like. At each location of a light source 20, a light signature 67 of that light source 20 may be extracted, for example, by executing a Fourier transform on the sensed signal and storing that spectrum. Ideally the signature 67 is obtained from a single light source 20 at a time (as limited by collimation or by the technique described below with respect to FIG. 6). The signatures and the corresponding locations of the light sources 20 are collected to build a map 55 in the from of a navigation table with a logical row holding a signature of each light source 20 in a first column linked to spatial coordinates of the light source 20 in a second column. Notably this process does not require access to any building infrastructure and thus is relatively easy to perform. Once this data navigation table is complete it may be uploaded to the mobile device 10, for example, through wireless interconnection. The map 55 may generally include not only a tabular listing of signatures 67 and spatial locations but may also provide for a graphic representation of walls and other building fixtures in the form of a floorplan or the like to be displayed by the user on the touch screen 32 (for example, as shown in FIG. 1).

The light received by the mobile device 10 from multiple light sources 20 (and the corresponding signatures 67) will provide a combined spectrum 70 being generally the superposition of multiple signatures 67 of different light sources 20 with different weighting values dependent on the strength of the light received. In order to determine the angle of each light source 20, the light from individual light sources 20 detected by each of the photodetectors 36*a* and 36*b* must be isolated.

Figure 6:
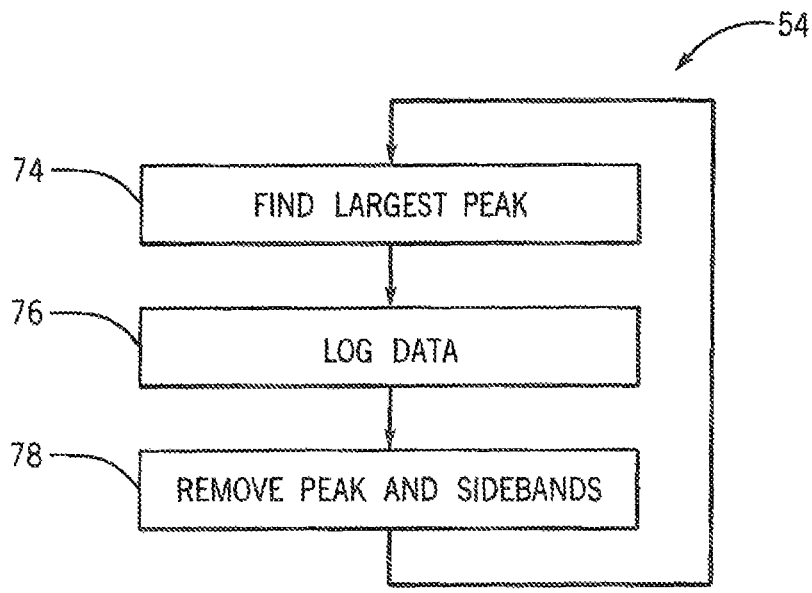
FIG. 6 is a flowchart of a program executed by the mobile device for extracting light signatures from the combined frequency signatures of FIG. 5.

Referring now also to FIG. 6, this isolation of the light from each light source 20 may be performed iteratively, in one embodiment, by finding the largest peak (center frequency 68*a*) in the combined spectrum 70 as indicated by process block 74. This center frequency 68 is matched to a center frequency of a stored signature 67 which may be used to identify a location of a particular light source 20 in the interior 12. This location is logged as well as the relative intensity of light of the center frequency 68 as detected by the different photodetectors 36*a* and 36*b* which will be used to determine the angle of receipt of the light from the identified light source 20. This logging process is indicated by process block 76.

Next, at process block 78 the identified center frequency 68*a* is removed (subtracted) from the combined spectrum 70 together with the sidebands associated with that center frequency 68*a* (identified from the signature 67). The processes of process blocks 74, 76, and 78 are then repeated using the modified combined spectrum 70, finding the next largest peak at process block 74 and so forth until the remaining next largest peak at process block 74 falls below a predetermined minimum value or until a predetermined number of light sources 20 have been identified.

In this process, occasionally, a signature 67 extracted from the combined spectrum 70 will be close to multiple light sources 20 listed on the map 55 rendering it difficult to identify a single one of those multiple light sources 20 as the source of the signature 67. In this case, ambiguity may be resolved by looking at pairs of signatures from two light sources 20 within the field-of-view 30. That is, the map 55 is queried to find two signatures 65 of light sources 20 that are close to each other, the two signatures 67 including the ambiguous signature 67.

First, all possible pairs of signatures 65 within the map 55 matching the detected signatures are collected. Matches with low confidence are then removed (for example, separated by less than 20 hertz). Centroid locations for the remaining pairs are then determined and pairs that are separated from the centroid by a distance that exceeds the field-of-view 30 are then eliminated. The result is a particular light source 20 with high confidence. Generally only a few lights will be visible by the photodetectors 36 at a given time simplifying this process.

Figure 7:
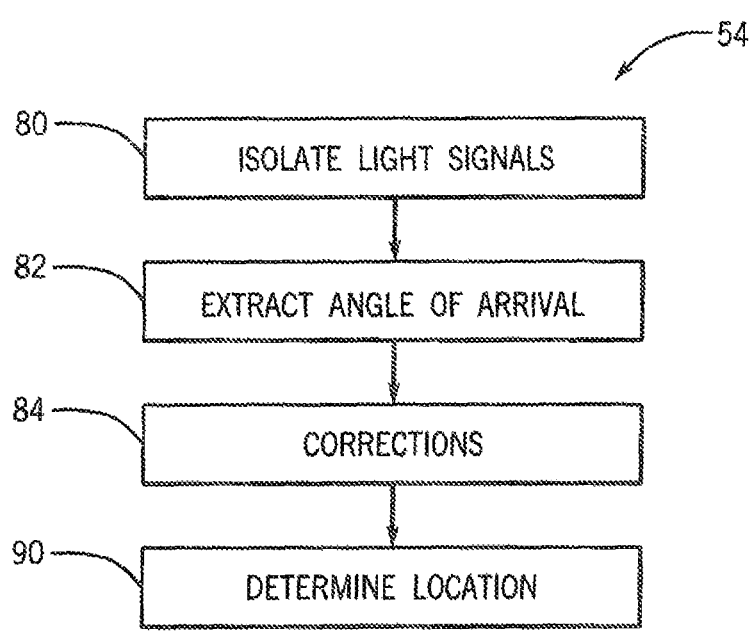
FIG. 7 is a flowchart depicting the program steps of navigation using identified light signatures as may be executed by the mobile device.

Referring now to FIG. 7, using these techniques of signature identification and one-dimensional angle determination, the process of navigation may begin as indicated by process block 80 by separating from the light signals received by the photodetectors 36*a* and 36*b* according to the signatures 67 of those light signals associated with particular light sources 20. Based on this separation, the portions of the signals associated with each light source 20 received by different of the photodetectors 36*a* and 36*b* are compared using the process described with respect to FIG. 4 to extract an angle of arrival of the light at the mobile device 10. This process yields a data set providing an angle of arrival value for each of the light sources 20 within the field-of-view 30 of the mobile device 10 as indicated by process block 82.

Figure 8:
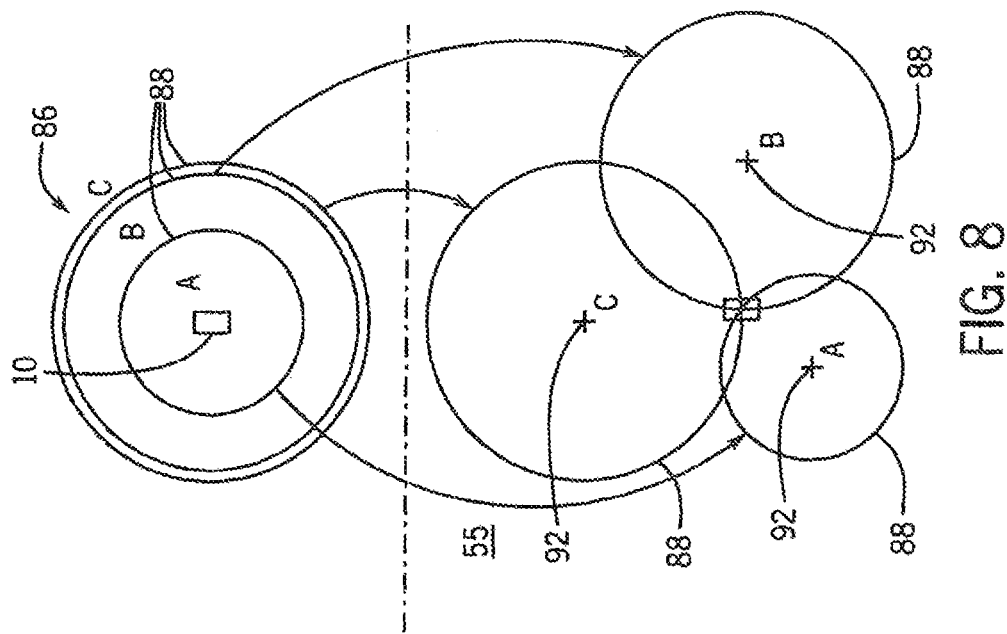
FIG. 8 is a graphical representation of a triangulation using multiple one-dimensional light angles of light fixtures with known positions.

Referring to FIG. 8, the acquired data set 86 of multiple angles of arrival may be represented as three different light sources 20 (designated A, B, C) or as circles 88 of constant angular deviation around the mobile device 10, the circles 88 representing the uncertainty with respect to the bearing of the particular light source 20 even though its angular relationship to the mobile device is known. The radius of the circles 88 is a function of the angle of the received light and an assumed height of the ceiling that may, for example, be recorded in the map 55 of the various light sources 20 described above.

This acquired data set 86 may be corrected as indicated by process block 84. In the above example, it is assumed that the optical axes 38 of the photodetectors are substantially vertical. Although this is the preferred attitude of the mobile device 10, it is contemplated that the device may not be so held and, accordingly, at process block 84 the acquired data set 86 may be corrected, for example, using the accelerometer in the mobile device to deduce an actual angle of the optical axes 38 and use either a compass or rotational gyroscope to determine the bearing of that angulation of the optical axis 38. Alternatively or in addition, at process block 84, optional additional navigational cues may be collected, for example, through dead reckoning using the accelerometer and rotational gyroscope from a previously located position, or by using Wi-Fi triangulation or other navigational techniques.

At process block 90, the acquired data set 86 (as optionally corrected at process block 84) may be used to determine the location of the mobile device 10. Referring again to FIG. 8 and using the example of this figure, a location of the mobile device 10 may be determined by centering each of the circles 88 of constant angular deviation on the actual map locations 92 of their identified light sources 20. The closest intersection of the circles 88 will then define the location of the mobile device 10. In the case when only two light sources 20 have been identified, the intersection of the circles 88 will provide two possible locations which may be selected between, for example, through one of the auxiliary techniques, for example, dead reckoning from the last location, for independent locating systems. In the case where only one light source 20 has been imaged, an intersection between the trajectory deduced by dead reckoning and the circle 88 of constant angular deviation may be used.

Figure 9:
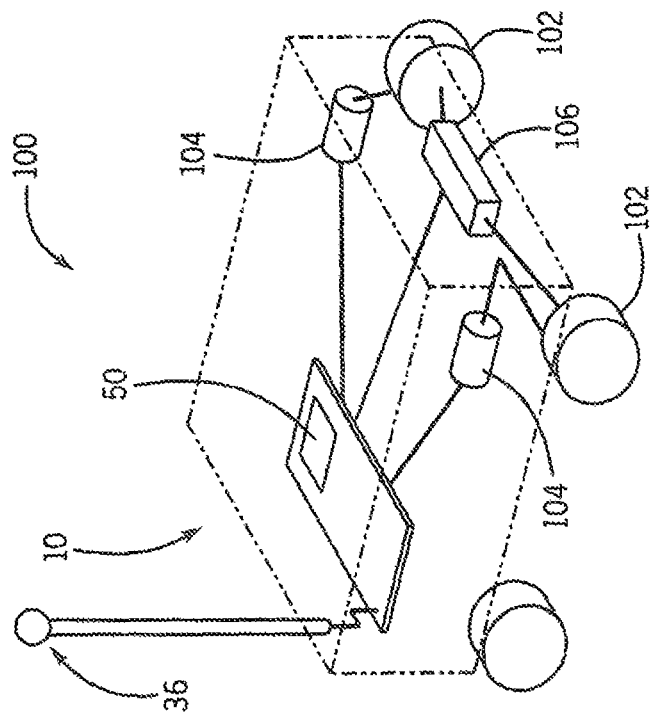
FIG. 9 is a perspective view of a robotic cart providing navigation using the technique of the present invention.

Referring now to FIG. 9, the present invention may be used not only with a handheld device by an individual but incorporated into an autonomous vehicle 100 having, for example, wheels 102 or other traction devices driven by electric motors 104 and steerable by a motorized steering linkage 106. Each of the electric motors 104 and the motorized steering linkage 106 may receive commands from a processor system 46 of the mobile device 10, the latter also receiving signals from photodetectors 36, for example, on a mast or the like. In this way navigation through an interior space may be provided without the need for expensive track, buried guide wires, or beacon systems.

It will be appreciated that the present invention is not limited to identification of a single characteristic frequency or to identification of the first harmonic as a signature but rather may identify multiple other harmonics as well. Other features of the light sources 20 including, for example, variations in light, color, shape, or brightness may also be used to augment the identification process of the present invention to provide a multidimensional matching with improved reliability.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A mobile device for indoor location determination comprising:

a first light sensor having a first axis passing through the first light sensor, the first light sensor receiving and measuring light received at a first range of angles with respect to the first axis, the first light sensor having a first angular sensitivity function describing a sensitivity of the first light sensor as a function of angle in the first range of angles over a field of view;

a second light sensor having a second axis parallel to the first axis and passing through the second light sensor, the second light sensor receiving and measuring light received at a second range of angles with respect to the second axis, the second light sensor having a second angular sensitivity function describing a sensitivity of the second light sensor as a function of angle in the second range of angles over the field of view, the second angular sensitivity function being different from the first angular sensitivity function so that an angle of a light measured by the first light sensor and second light sensor may be deduced from a known difference between the first angular sensitivity function and the second angular sensitivity function;

an electronic computer receiving signals from the first and second light sensors and having:

(a) a processor; and (b) a memory communicating with the processor and holding a program executable by the processor to:

(i) measure signals from the first light sensor and the second light sensor to identify multiple light source signals from multiple light sources using the first and second light sensors within the fields-of-view according to known light source signatures;

(ii) determine an angle of each of the multiple light sources with respect to the mobile device based on a matching of light source signatures and a determination of a difference in the measured signals from the first light sensor and second light sensor of the matched light sources caused by a predetermined differences between the first angular sensitivity function and the second angular sensitivity function of the first and second light sensors respectively; and (iii) identify the location of the mobile device based on the angle of the multiple light sources and a known mapping of light sources to locations.

2. The mobile device of claim 1 wherein the field-of-view is greater than 30 degrees.

3. The mobile device of claim 1 wherein the first and second light sensors provide a cutoff frequency greater than 80 kilohertz.

4. The mobile device of claim 2 wherein the first and second light sensors provide a frequency response operatively extending to 160 kilohertz.

5. The mobile device of claim 1 wherein the first and second light sensors have a dynamic range of at least 80 decibels.

6. The mobile device of claim 1 wherein the first and second light sensors have parallel axes.

7. The mobile device of claim 1 wherein each of the first and second light sensors has a separate lens.

8. The mobile device of claim 1 wherein the memory further holds a map identifying locations of light sources and light source signatures for those light sources and wherein the electronic computer identifies the location of the multiple light sources by matching light source signatures to frequencies extracted from the signals of the first and second light sensors.

9. The mobile device of claim 1 wherein the electronic computer isolates multiple light signals by identifying and suppressing sidebands of fundamental frequencies of each of the multiple light sources.

10. The mobile device of claim 1 further including a three-axis accelerometer and wherein the program identifies an orientation of the axes to correct the determined angles of the multiple light sources.

11. The mobile device of claim 10 further including a compass and wherein the program identifies an orientation of the mobile device with respect to the Earth's magnetic field to identify the location.

12. The mobile device of claim 10 further including at least one of a gyroscope and a compass and wherein the program augments identification of the location of the mobile device using dead reckoning based on inertial guidance provided by the three-axis accelerometer.

13. The mobile device of claim 1 wherein further including a cell phone communication circuit for allowing communication over a cell phone network.

14. The mobile device of claim 1 wherein the mobile device is a vehicle having electric motors for movement and wherein the electronic computer further controls the electric motors to control motion of the vehicle using the identified location of the mobile device.

15. A method of determining indoor position location using:

a mobile device having:

a first light sensor having a first axis passing through the first light sensor, the first light sensor receiving and measuring light received at a first range of angles with respect to the first axis, the first light sensor having a first angular sensitivity function describing a sensitivity of the first light sensor as a function of angle in the first range of angles over a field of view;

a second light sensor having a second axis parallel to the first axis and passing through the second light sensor, the second light sensor receiving and measuring light received at a second range of angles with respect to the second axis, the second light sensor having a second angular sensitivity function describing a sensitivity of the second light sensor as a function of angle in the second range of angles over the field of view, the second angular sensitivity function being different from the first angular sensitivity function so that an angle of a light measured by the first light sensor and second light sensor may be deduced from a known difference between the first angular sensitivity function and the second angular sensitivity function;

an electronic computer receiving signals from the first and second light sensors and having:

a processor; and a memory communicating with the processor and holding a program executable by the processor to:

(i) measure signals from the first light sensor and the second light sensor to identify multiple light source signals from multiple light sources using the first and second light sensors within the fields-of-view according to known light source signatures;

(ii) determine an angle of each of the multiple light sources with respect to the mobile device based on a matching of light source signatures and a determination of a difference in the measured signals from the first light sensor and second light sensor of the matched light sources caused by a predetermined differences between the first angular sensitivity function and the second angular sensitivity function of the first and second light sensors respectively; and (ii) identify the location of the mobile device based on the angle of the multiple light sources and a known mapping of light sources to locations; the method comprising the steps of:

(a) creating a map providing the location of multiple light sources within an environment and associating each light source with a light source signature; and (b) using the mobile device to:

(i) identify multiple light source signals from the first and second light sensors within the field-of-view according to known light source signatures;

(ii) determine an angle of the multiple light sources with respect to the respective axes based on the different angular sensitivities of the first and second light sensors; and (iii) identify the location of the mobile device based on the angle of the multiple light sources on the map.

16. The method of claim 15 wherein the multiple light sources include LED lights.

17. The method of claim 16 wherein the multiple light sources include fluorescent lights.

18. The method of claim 15 wherein the multiple light sources are positioned at a ceiling at least three meters above a floor and the first and second independent light sources are elevated from a floor by less than 1.5 meters.

19. The method of claim 18 wherein the multiple light sources are positioned at a ceiling at least four meters above the ground.

20. The method of claim 15 further wherein the mobile device further (iv) identifies the orientation of the mobile device based on the angle of the multiple light sources.

21. The mobile device of claim 1 wherein the first and second light sensors have a dynamic range in excess of 80 decibels.

22. The mobile device of claim 1 wherein the first and second light sensors have a response with a cutoff frequency in excess of 60 kilohertz.

23. The mobile device of claim 1 wherein the first and second light sensors are physically separate and electrically independent.

24. The mobile device of claim 1 wherein the first and second range of angles are identical.

* * * * *